United States Patent
Romero Pintado et al.

(10) Patent No.: US 7,233,120 B2
(45) Date of Patent: Jun. 19, 2007

(54) OPTIMAL FAN PRESENCE DETECTION

(75) Inventors: Enrique Romero Pintado, Valencia (ES); Robin L. Getz, Medway, MA (US)

(73) Assignee: Analog Devices, Inc., Norwood, MA (US)

( * ) Notice: Subject to any disclaimer, the term of this patent is extended or adjusted under 35 U.S.C. 154(b) by 0 days.

(21) Appl. No.: 11/353,387

(22) Filed: Feb. 14, 2006

(65) Prior Publication Data
US 2006/0181231 A1 Aug. 17, 2006

Related U.S. Application Data

(60) Provisional application No. 60/652,720, filed on Feb. 14, 2005.

(51) Int. Cl.
*H02P 6/00* (2006.01)

(52) U.S. Cl. .................. 318/254; 318/504; 388/909

(58) Field of Classification Search ............... 318/138, 318/254, 439, 500, 503, 504; 388/909
See application file for complete search history.

(56) References Cited

U.S. PATENT DOCUMENTS 5,436,827 A * 7/1995 Gunn et al. .................. 700/82
6,836,092 B2 * 12/2004 Sivertsen .................... 318/639

OTHER PUBLICATIONS

ATmega 128 Microcontroller by Atmel Corp., p. 1 shows the microcontroller system features, p. 2 shows the pin configuration, p. 3 shows the circuit block diagram.*

* cited by examiner

*Primary Examiner*—Bentsu Ro
(74) *Attorney, Agent, or Firm*—Bromberg & Sunstein LLP

(57) ABSTRACT

Detecting the presence of an electric fan is described. A current sink circuit is coupled to a pulse width drive output of a fan control circuit. A logic state in a logic input buffer is defined based on current flow through the current sink. The logic state indicates if a fan is coupled to the pulse width drive output.

14 Claims, 6 Drawing Sheets

OPTIMAL FAN PRESENCE DETECTION

This application claims priority from U.S. Provisional Patent Application 60/652,720, filed Feb. 14, 2005, the contents of which are incorporated herein by reference.

FIELD OF THE INVENTION

The invention relates to cooling of heat producing components, and more specifically, to controlling cooling fans used in a computer system.

BACKGROUND OF THE INVENTION

Many present electronic systems incorporate cooling provided by brushless DC motor-based fans. These motors include control electronics which turn the coils of the motor on and off to get the rotor to spin. Many present fans have four wires accessible to the end user—a positive rail, a negative rail, a tachometer output which indicates speed, and a fourth wire for controlling the speed. These types of motors are very common as four wire high frequency fans that can be found in personal computers.

Controlling the speed of these types of brushless DC motors requires some way to slow the rate of rotation. This is often accomplished in one of two ways: (1) varying the DC voltage on the positive rail, which controls the amount of energy in the stator and thereby the speed of the rotor, or (2) by Pulse Width Modulating (PWM) the positive rail at its maximum voltage, which controls the amount of time the stator is energized and thereby the speed of the rotor. Many applications use PWM because of its ease of implementation from both a silicon and external circuit perspective.

SUMMARY OF THE INVENTION

Embodiments of the present invention are based on detecting the presence of one or more electric fans. A current sink circuit is coupled to a pulse width drive output of a fan control circuit. A logic state in a logic input buffer is defined based on current flow through the current sink. The logic state indicates if a fan is coupled to the pulse width drive output.

In further embodiments, defining the logic state in the logic input buffer may include latching the logic state as a bit in the logic input buffer. Energizing the current sink may be performed when the fan control circuit is initially energized, in response to a software instruction, and/or in response to a user instruction. The fan control circuit may control a four-wire electric cooling fan in an electronic system such as a fan driven by a brushless DC motor and/or a motor having more than two poles. Defining the logic state in the logic input buffer may occur independently of any fan rotation in a fan controlled by the fan control circuit and/or independently of any tachometer sensing signal from a fan controlled by the fan control circuit.

Embodiments also include an electric fan detection circuit having a current sink circuit coupleable to a pulse width drive output line of a fan control circuit; and a logic input buffer having a logic state definable based on current flow through the current sink circuit, the logic state indicating if a fan is coupled to the pulse width drive output.

In further embodiments, the logic state may be definable based on latching the logic state as a bit in the logic input buffer. The current sink circuit may be coupleable to the pulse width drive output line when the fan control circuit is initially energized, in response to a software instruction, and/or in response to a user instruction. The fan control circuit may control a four-wire electric cooling fan in an electronic system, such as a fan driven by a brushless DC motor and/or a motor having more than two poles. The logic input buffer may be definable independently of any fan rotation in a fan controlled by the fan control circuit, and/or independently of any tachometer sensing signal from a fan controlled by the fan control circuit.

DETAILED DESCRIPTION OF SPECIFIC EMBODIMENTS

It is useful to know if a fan control circuit actually is connected to and controlling a fan. Previous methods for fan detection would monitor a tachometric sensing line associated with the fan. A major disadvantage of this approach is that the fan must be spinning and providing valid tachometer pulses. Various embodiments of the present invention are directed to techniques for using the Pulse Width Modulation (PWM) output of a fan control circuit to detect the presence or absence of a fan connected to the output. With embodiments of the present invention, it does not make any difference if the fan is spinning or if it is stopped as its tachometric output is not used to determine the fan presence.

Figure 1:
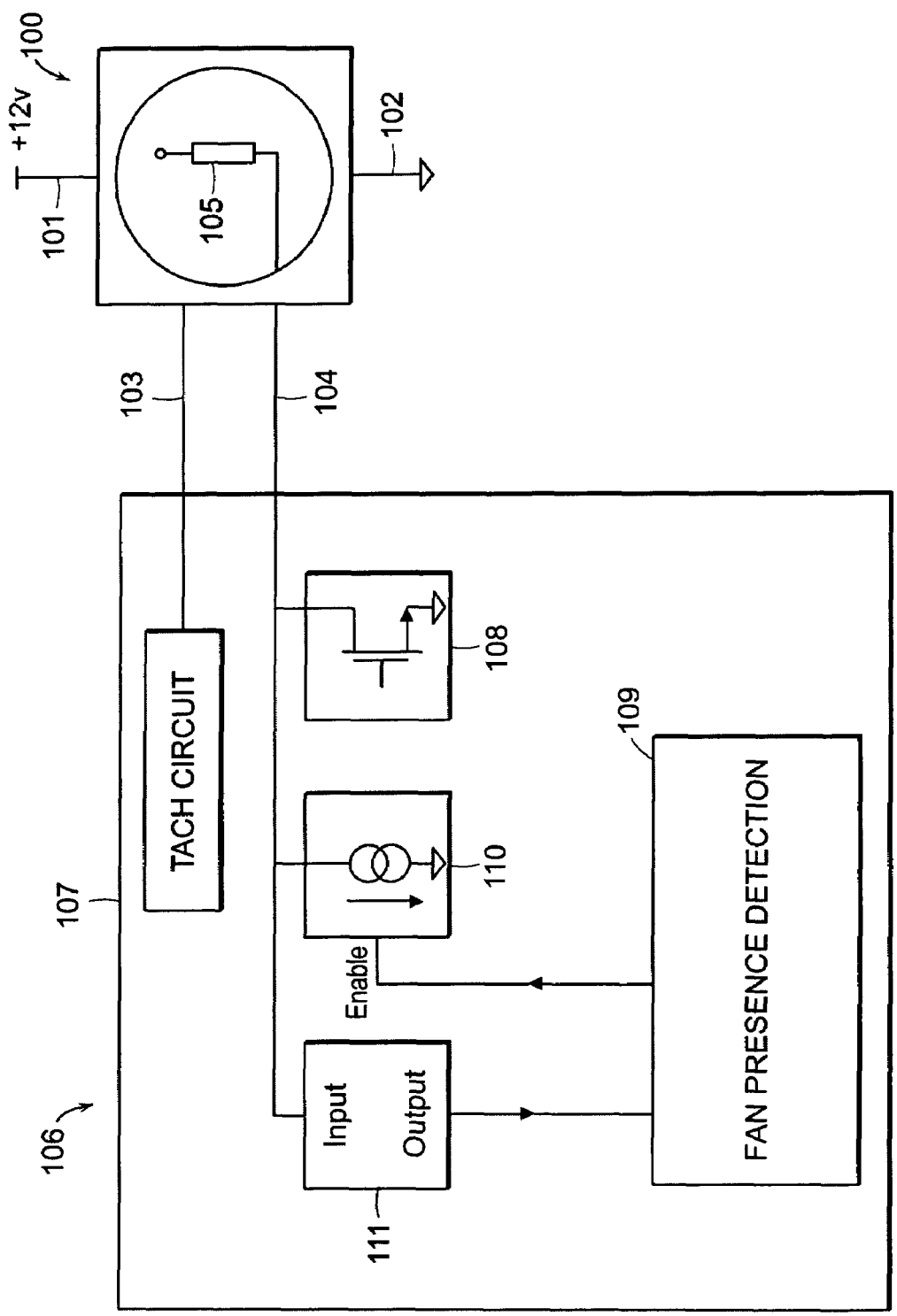
FIG. 1 is a simplified diagram showing one general embodiment of the present invention.

FIG. 1 is a simplified diagram showing one general embodiment of the present invention. An electric fan 100 may be a cooling fan for an electronic system such as a computer, powered by a brushless DC motor. The fan 100 has four associated wires: (1) a positive rail 101 supplying +12 vdc to power the motor, (2) a negative rail 102 providing chassis common for current flow, (3) a tachometer line 103 providing a pulsed signal indicative of fan speed, and (4) a Pulse Width Modulator (PWM) control line 104 that provides a drive control signal to the fan motor to control the speed of the fan. The fan also includes an internal pull up circuit 105, for example, providing +4.75 vdc ±10% which sources 5 mA of current.

Connected to the tachometer line 103 and PWM control line 104 is a fan control circuit 106. The fan control circuit 106 includes a tachometer sensing circuit 107 connected to the tachometer line 103 for monitoring the speed of the fan 100. PWM driver 108 is an open drain FET that drives the PWM control line 104. The duty cycle (percent of ON-time) of the PWM driver 108 controls the speed of the fan 100.

Fan presence detection circuit 109 controls a current sink 110 connected to the PWM control line 104. The fan presence detection circuit 109 also monitors the output of fan presence input buffer 111. To detect the presence of a fan connected to the PWM control line 104, the fan presence detection circuit 109 enables the current sink 110 for a brief period, e.g., 5 msec. In specific embodiments, the detection period does not need to be 5 msec (which is convenient for debouncing reasons) and may be longer or shorter, or even programmable in duration. Once enabled, the current sink 110 will drive some small amount of current from the fan's internal pull up 105 (e.g., ~100 µA). This creates a defined logic state for the fan presence input buffer 111 which indicates the presence or absence of a fan. A logic HIGH means the fan is present, while a logic LOW means the fan output is not populated. The logic state is latched from the fan presence input buffer is 111 as a bit in an internal register, and the system can read the latched bits assigned for each PWM control line 104 (a single fan control circuit 106 can monitor and control one or more assigned fans). The system thus knows if it is populated with any four-wire fans and which lines they are on, and can act accordingly to enable high frequency PWM drive.

In specific embodiments, fan presence detection circuit 109 can be engaged at various times in the operating cycle, for example, when the system powers on, in response to a user instruction, and/or in response to a software instruction such as a bios demand. On one fan control chip, the ADT7476 produced by Analog Devices of Norwood, Mass., the latter approach is used because the device also supports three-wire fans (for which the present techniques may not be applicable).

One advantage of embodiments of the present invention is that fan detection can be done independently of the signal on the tachometer sensing line 103 so that the fan motor need be on and turning the fan. Embodiments are also appropriate for any four-wire fan with two or more poles as well (2, 3, 4, . . . n).

In some embodiments, the open-drain structure of the PWM driver 108 may need remain in the OFF state while performing the fan detection. This may produce a positive output signal on the PWM control line 104, which would turn ON the fan 100 for the duration of the fan detection process. However, in many cases the fan 100 may not actually spin since the length of the fan detection cycle may not be long enough to significantly energize the coils of the fan motor. Thus, this should not be seen as a significant disadvantage since fan detection may be performed during system power up when fans are usually spinning for a short period of time. Even if the system needs to be powered up with the fans off (silent) for acoustic reasons, given the short length of the test, it should not be noticeable for the user that the fan has been switched on for such a short interval of time. Otherwise, switching ON the open-drain PWM driver 108 could ground the input to the fan detection input buffer 111, which could generate a false indication that no fan is connected to the fan control circuit 106.

Figure 2A:
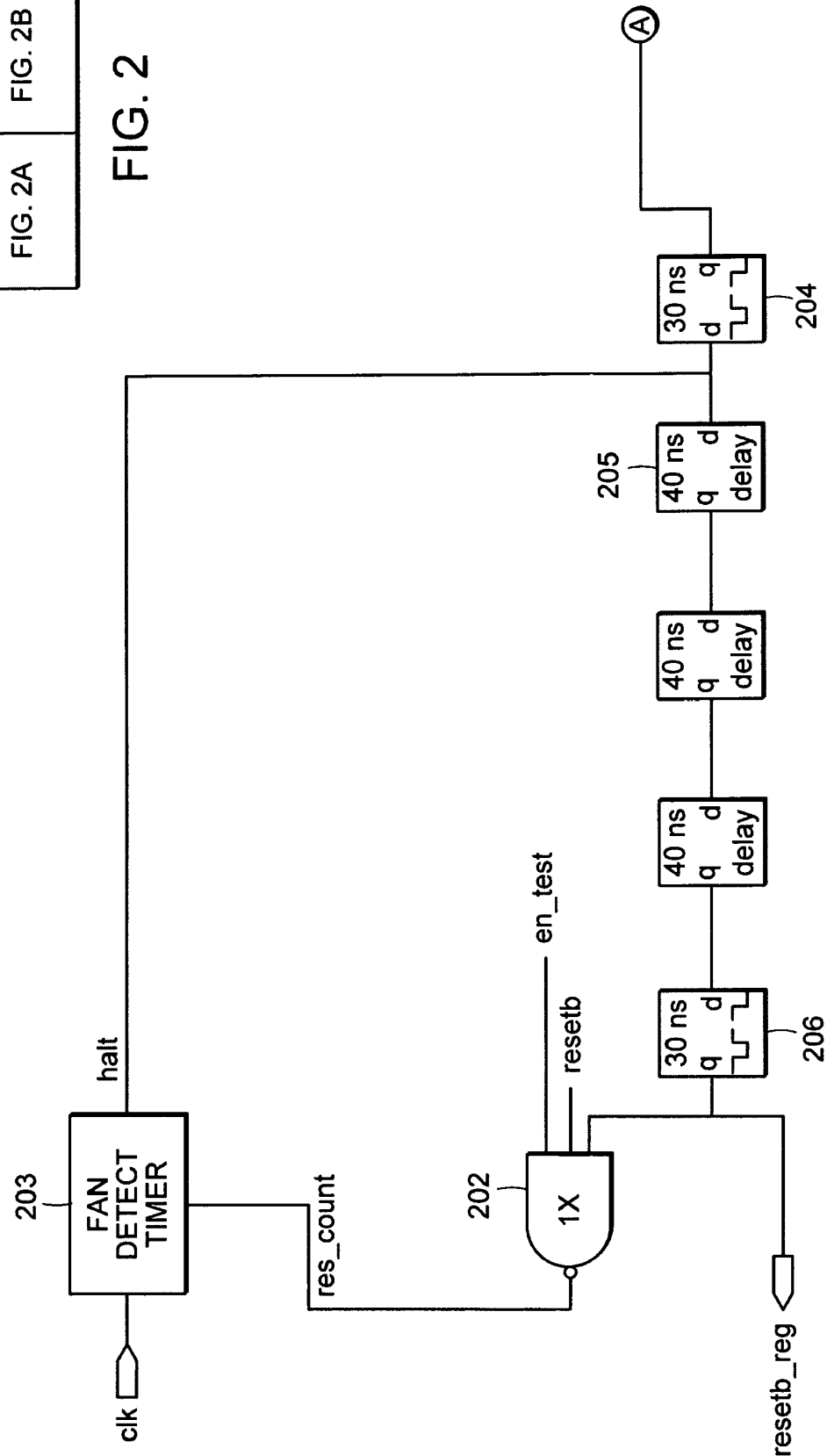
FIG. 2 is logical block diagram showing a stand alone test circuit for fan presence detection according to one specific embodiment.
Figure 2B:
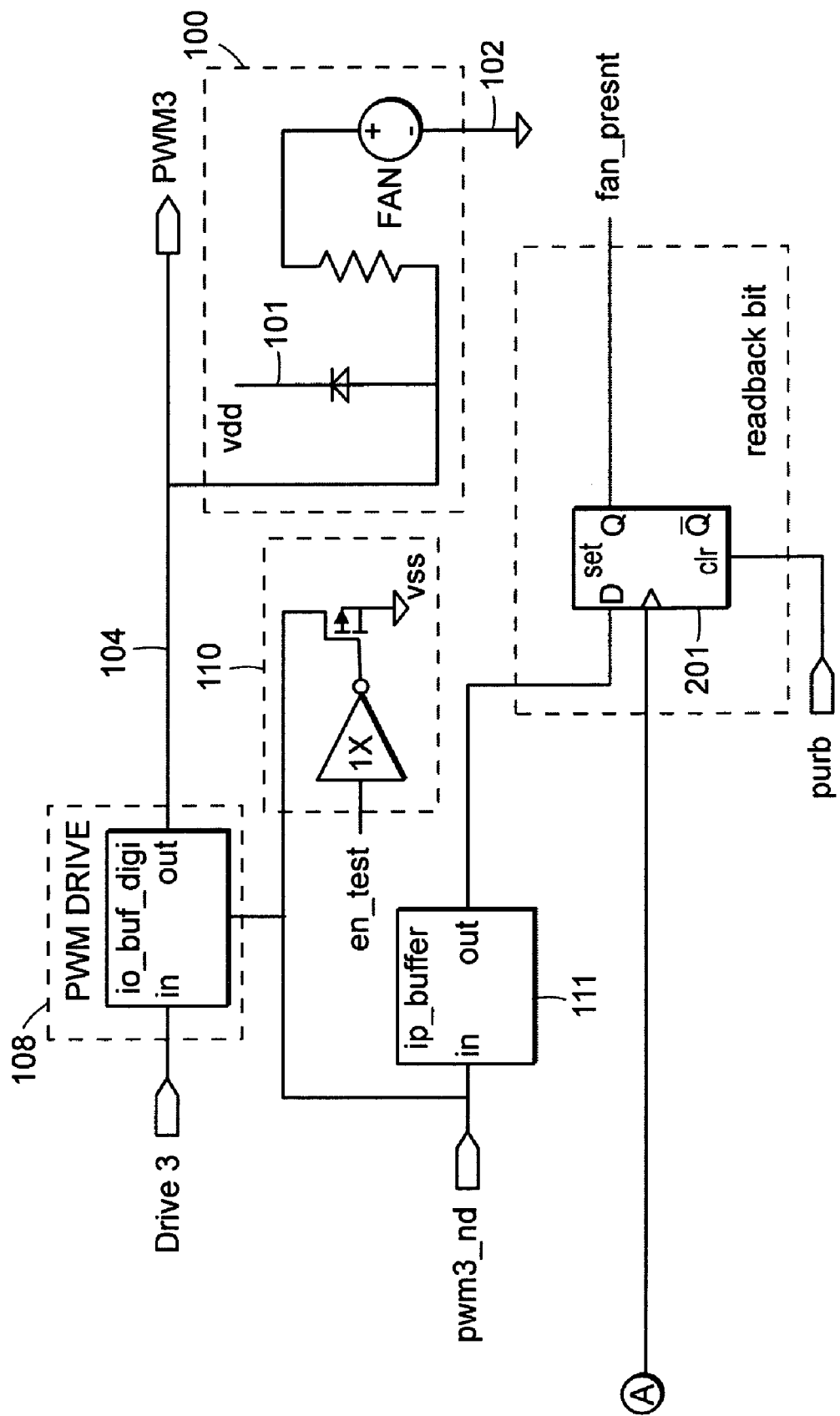

FIG. 2 is logical block diagram showing a stand alone test circuit for fan presence detection according to one specific embodiment. Many of the same blocks from FIG. 1 are present starting with four-wire fan 100 having a positive rail 101 supplying +12 vdc to power the brushless dc-motor, a negative rail 102 providing chassis common for current flow, and a Pulse Width Modulator (PWM) control line 104 driven by PWM driver 108 that provides a drive control signal to the fan motor to control the speed of the fan 100. In response to a user or system programmed request to perform a fan presence test, a test enable signal input turns on current sink 110. Current sink 110 turns on PWM drive 108 for a short fan presence detect period, e.g., 5 msec. When a fan is actually connected to the PWM control line 104, the fan's internal pull up circuit supplies a small amount of current (e.g., ~100 µA) to the current sink 110. This also creates a logic HIGH voltage level on the input to the fan presence input buffer 111 whose output is an input to fan presence latch 201. The output of the fan presence latch 201 is a logic bit (0/1) indicating to the system whether or not a fan is present and connected.

The left side of FIG. 2 is a timer circuit that controls the length of the fan presence detection cycle. When the user or system programs in a test enable signal to start a fan presence detection cycle, that causes test timing NAND-gate 202 to generate a reset count signal starting fan detect timer 203. In effect, the fan detect timer 203 starts counting down to when the readback bit is due to be set in the fan presence latch 201. Based on a programmable clock signal, at the end of the fan presence detection cycle (e.g., 5 msec), the fan detect timer 203 generates a halt signal output. The halt signal clocks a latching one shot 204 which generates a pulse (e.g., 30 nsec.) to clock the fan presence readback bit into the fan presence latch 201. The halt signal also triggers a set of delays 205 which form a delay line to clock a reset one shot 206. The output of the reset one shot 206 can be used to terminate the test enable signal (to end the test and prevent rerunning the test) and also to end the reset count signal from the test timing NAND-gate 202 so that the fan detect timer 203 does not restart.

Figure 3:
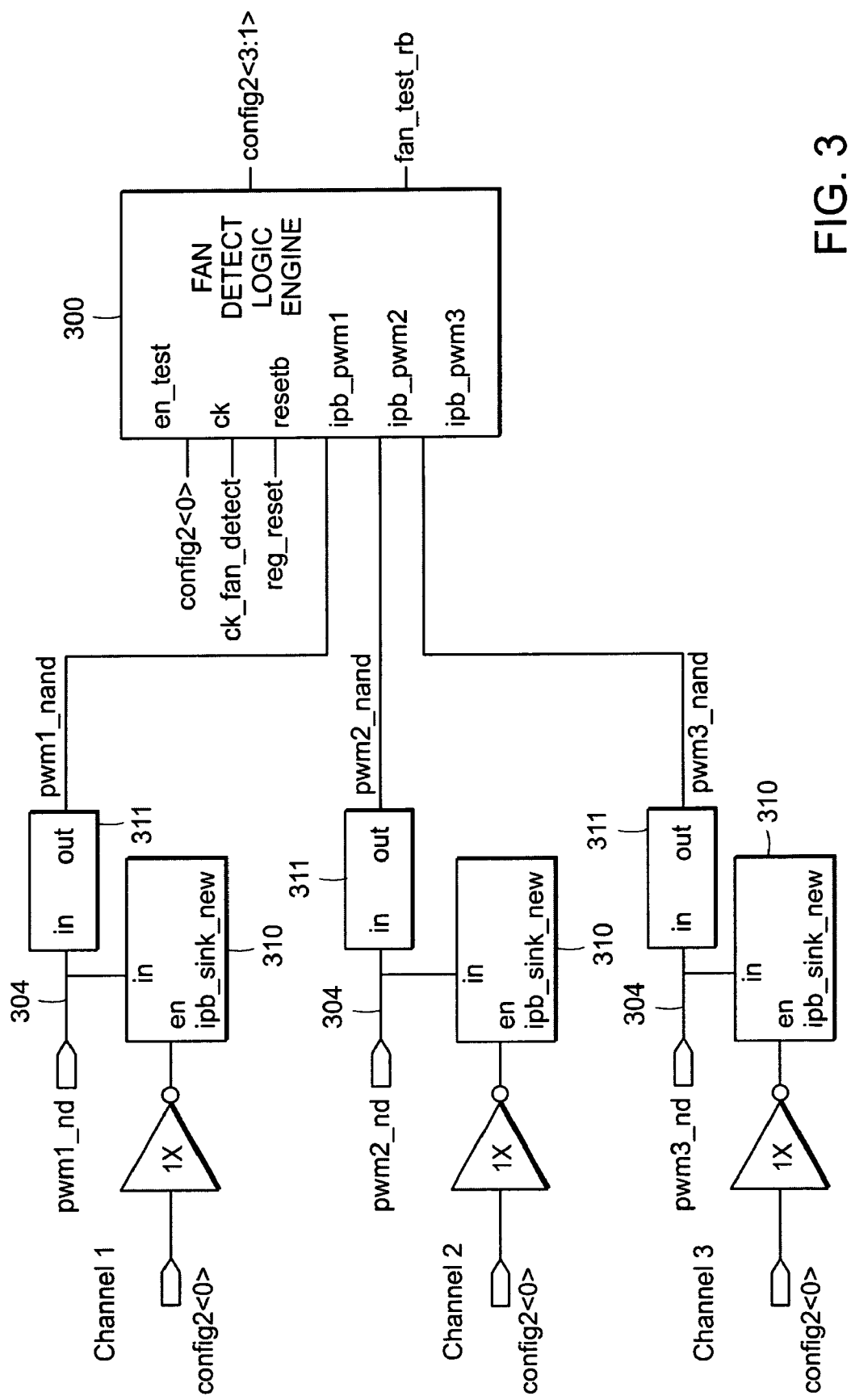
FIG. 3 is a top level schematic of one specific fan detection circuit according to an embodiment of the present invention.

FIGS. 1 and 2 show principles of various embodiments for a single fan system. FIG. 3 is a top level schematic of a fan detection circuit according to an embodiment of the present invention in which multiple fans are available. In FIG. 3, there are three channels for three different fans, each having an associated PWM control line 304, current sink 310, and input buffer 310, which operate much like their corresponding elements in FIGS. 1 and 2. In the specific embodiment shown in FIG. 3, the output of each input buffer 311 goes to a common fan detect logic engine 300 to latch the logic signals of each channel.

Figures 4, 4A:
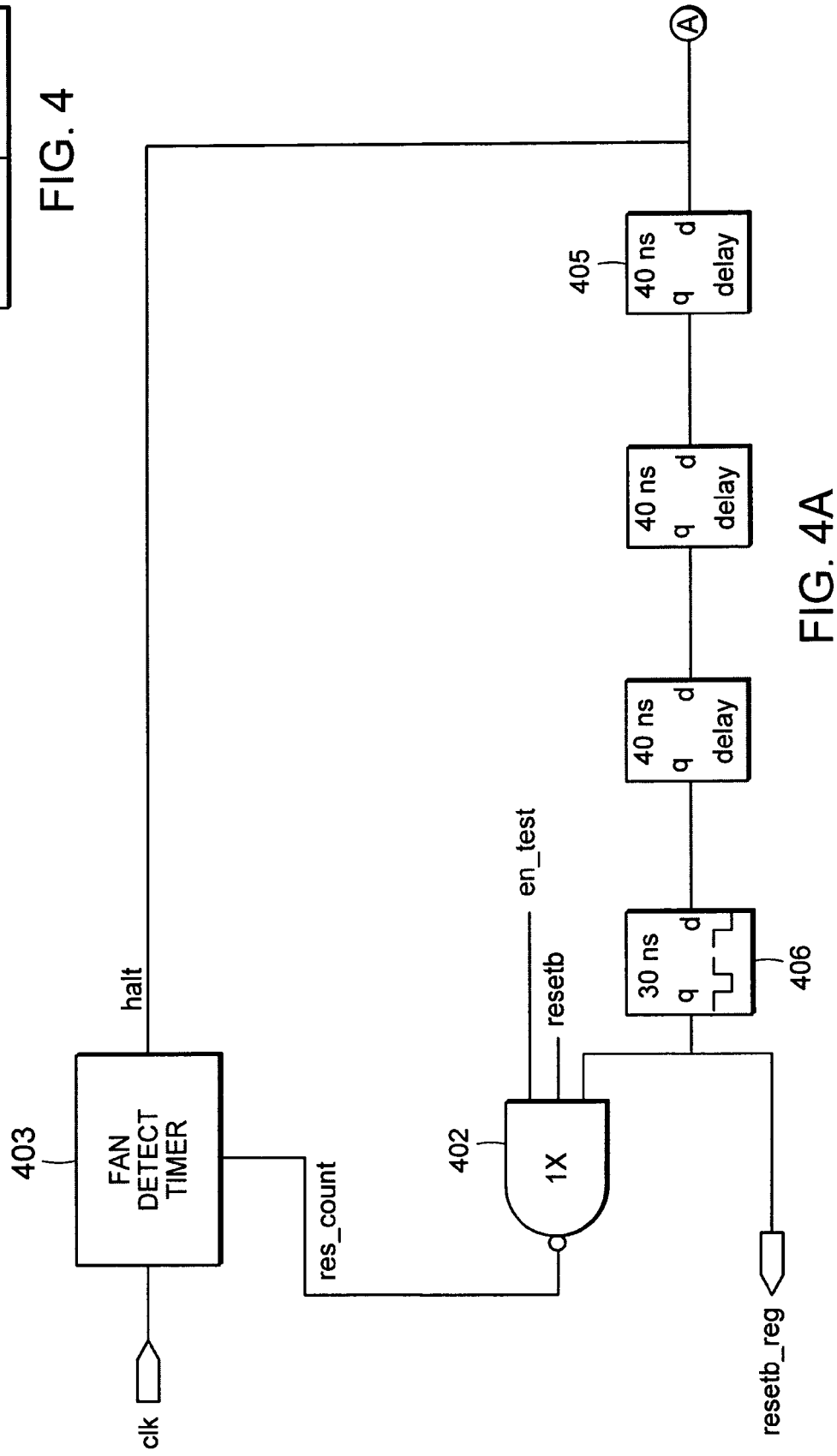
FIG. 4 provides further details regarding the circuit shown in FIG. 3.
Figure 4B:
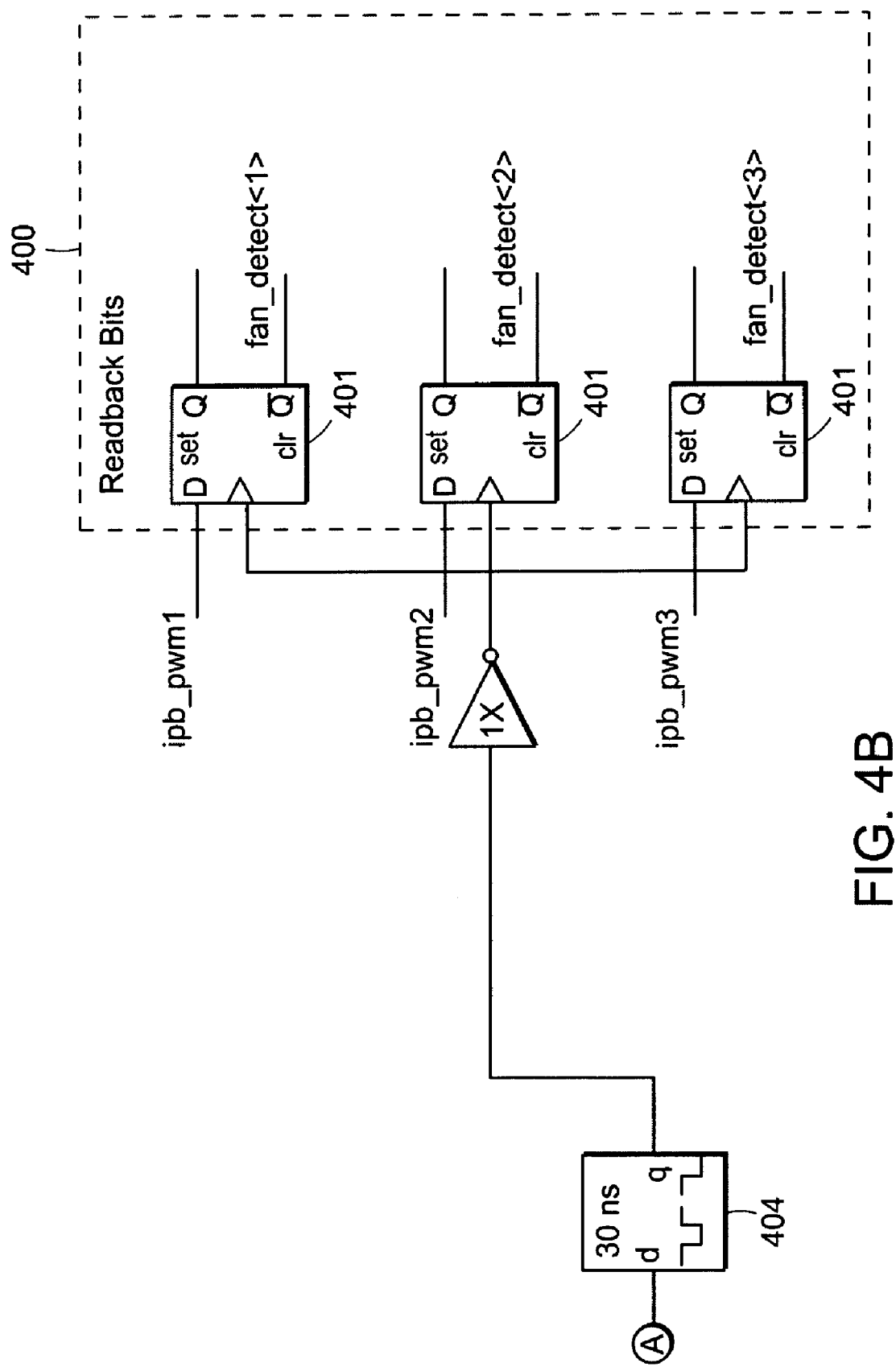

FIG. 4 shows some of the internal details of the fan logic detect engine 300 shown in FIG. 3. The left side of FIG. 4 is a timing circuit having a test timing NAND-gate 402, a fan detect timer 403, a set of delays 405 which form a delay line, and a reset one shot 406, all of which operate much as the corresponding parts of FIG. 2 described above. At the end of the fan presence detection period, the halt signal triggers the latching one shot 404 to generate a pulse (e.g., 30 nsec.) to clock the fan presence readback bits into corresponding fan presence latches 401 for each respective fan channel in the readback bit block 400.

Although various exemplary embodiments of the invention have been disclosed, it should be apparent to those skilled in the art that various changes and modifications can be made which will achieve some of the advantages of the invention without departing from the true scope of the invention.

What is claimed is:

1. An electric fan detection circuit comprising:
   a current sink circuit coupleable, in response to a software instruction, to a pulse width drive output line of a fan control circuit; and
   a logic input buffer having a logic state definable based on current flow through the current sink circuit, the logic state indicating if a fan is coupled to the pulse width drive output.

2. A circuit according to claim 1, wherein the logic state is definable based on latching the logic state as a bit in the logic input buffer.

3. A circuit according to claim 1, wherein the fan control circuit controls a four-wire electric cooling fan in an electronic system.

4. A circuit according to claim 1, wherein the fan control circuit controls an electric fan driven by a brushless DC motor.

5. A circuit according to claim 1, wherein the fan control circuit controls a motor having more than two poles.

6. A circuit according to claim 1, wherein the logic state in the logic input buffer is definable independently of any fan rotation in a fan controlled by the fan control circuit.

7. A circuit according to claim 1, wherein the logic state in the logic input buffer is definable independently of any tachometer sensing signal from a fan controlled by the fan control circuit.

8. A method of detecting the presence of an electric fan, the method comprising:
   in responds to a software instruction, energizing a current sink circuit coupled to a pulse width drive output of a fan control circuit;
   defining a logic state in a logic input buffer based on current flow through the current sink, the logic state indicating if a fan is coupled to the pulse width drive output.

9. A method according to claim 8, wherein defining the logic state in the logic input buffer includes latching the logic state as a bit in the logic input buffer.

10. A method according to claim 8, wherein the fan control circuit controls a four-wire electric cooling fan in an electronic system.

11. A method according to claim 8, wherein the fan control circuit controls an electric fan driven by a brushless DC motor.

12. A method according to claim 8, wherein the fan control circuit controls a motor having more than two poles.

13. A method according to claim 8, wherein defining the logic state in the logic input buffer occurs independently of any fan rotation in a fan controlled by the fan control circuit.

14. A method according to claim 8, wherein defining the logic state in the logic input buffer occurs independently of any tachometer sensing signal from a fan controlled by the fan control circuit.

* * * * *

UNITED STATES PATENT AND TRADEMARK OFFICE
CERTIFICATE OF CORRECTION

| | | |
|---|---|---|
| PATENT NO. | : 7,233,120 B2 | Page 1 of 1 |
| APPLICATION NO. | : 11/353387 | |
| DATED | : June 19, 2007 | |
| INVENTOR(S) | : Enrique Romero Pintado and Robin L. Getz | |

It is certified that error appears in the above-identified patent and that said Letters Patent is hereby corrected as shown below:

In Col. 5, line 15
replace "responds"
with --response--

Signed and Sealed this

Seventh Day of August, 2007

JON W. DUDAS
*Director of the United States Patent and Trademark Office*